Sept. 8, 1970     W. B. HARPMAN     3,527,253

SELF-CLEANING POPPET SPOOL VALVE

Filed April 22, 1968

INVENTOR
WEBSTER B. HARPMAN
BY

*W. B. Harpman*
ATTORNEY 3,527,253
SELF-CLEANING POPPET SPOOL VALVE
Webster B. Harpman, Youngstown, Ohio, assignor to King Valve Company, Alpena, Mich., a corporation of Michigan
Continuation-in-part of application Ser. No. 471,027, July 12, 1965. This application Apr. 22, 1968, Ser. No. 723,226
Int. Cl. F16k *11/02, 31/02*
U.S. Cl. 137—625.27                    5 Claims

ABSTRACT OF THE DISCLOSURE

A self-cleaning air valve having a single inlet part and wherein the valve elements are engaged in the manner of a spool valve and formed to act in the manner of a poppet valve, the spool being free floating for axial reciprocation and movable by the air pressure controlled by the valve.

---

This is a continuation in part of co-pending application, Ser. No. 471,027 filed July 12, 1965, now Pat. No. 3,384,122, May 21, 1968.

The principal object of the invention is the provision of a self-cleaning poppet spool air valve which may be of the four-way type.

A further object of this invention is the provision of an air valve incorporating novel valve elements and valve seats and means for moving the same relative to self-cleaning seats.

A still further object of the invention is the provision of an air valve incorporating a free floating spool having resilient valve elements thereon which are self-aligning with respect to the valve seats in said air valve.

A still further object of the invention is the provision of an air valve that can be mounted in any one of a number of positions and wherein the inlet and exhaust ports can be located in any one of a number of positions.

The air valve disclosed herein may be accurately described as a poppet spool valve inasmuch as the valve portions thereof incorporate novel valve elements comprising resilient members positioned and self-retaining a free floating spool and movable thereby into and out of sealing engagement with appropriately shaped valve seats which become self-cleaning and so arranged that dirt cannot jam the same. In controlling air cylinders or other air operated devices as commonly used in industry for actuating machine tools and the like, air valves are frequently employed, and heretofore such valves have had the common difficulty of being subject to jamming and sticking in operation due to the dirt in the air lines controlled by the valves. In large industrial plants wherein such valves are customarily found in large numbers the compressed air for actuating the air operated devices comes from compressed air sources through considerable piping, and the compressed air is usually contaminated through the inclusion of dirt, scale, oil and the like, which heretofore has adversely affected the operation of the control valves.

The present invention relates to an improved air valve, particularly adapted for controlling air operated devices such as air cylinders as applied to machine tools and the like and wherein the air valve is so formed as to be operative regardless of the presence of dirt, oil, scale or other contaminants in the air supply. The invention is disclosed in a four-way valve.

With the foregoing and other objects in view which will appear as the description proceeds, the invention resides in the combination and arrangement of parts and in the details of construction hereinafter described and claimed.

The invention is illustrated in the accompanying drawing, wherein.

Figure 1:
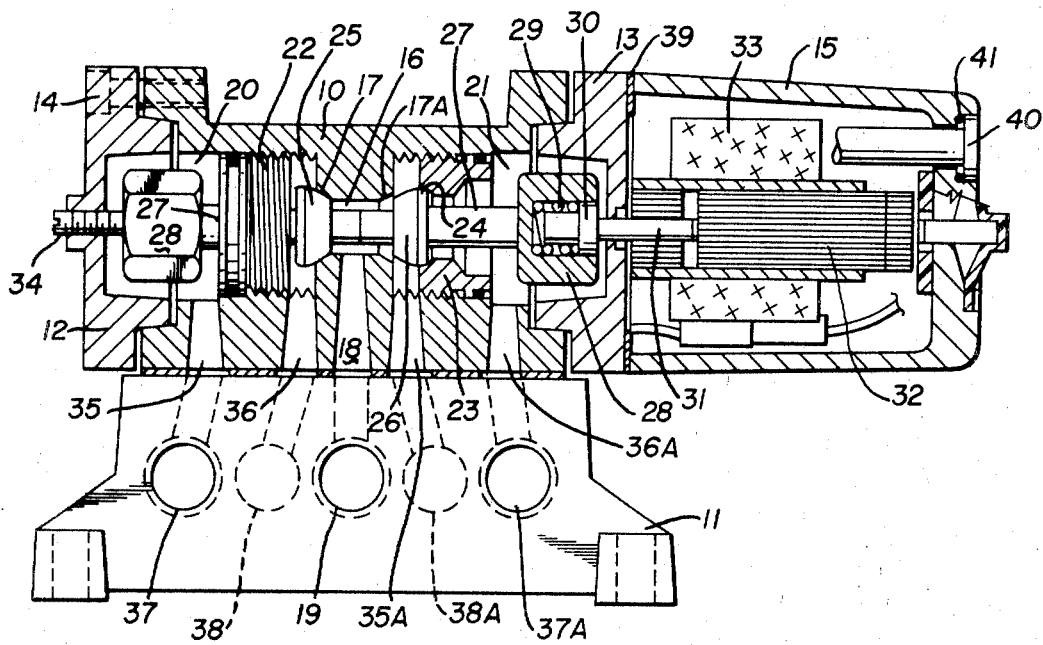
FIG. 1 is a cross sectional elevation of the four-way air valve.

By referring to the drawings and FIG. 1 in particular, it will be observed that the improved four-way air valve disclosed herein is so formed that it may be mounted in desired location with the exhaust ports in any one of a number of desirable positions, and that the pressure inlet ports and the exhaust ports may be alternately operative on either side of the valve and the valve itself turned or rotated so as to make it very convenient to install in connection with air cylinders to be controlled thereby.

In FIG. 1 of the drawings, the four-way air valve comprises a central body member 10, a base 11 and a pair of chamber forming body members 12 and 13 respectively, positioned on the opposite ends of the central body member 10. The body members 10, 11, 12, and 13 are assembled in sealing relation and the body members 10, 11, 12 and 13, are secured to one another by customary means, such as cap screws as generally indicated by the numeral 14. The central body member 10 and an end cover 15 are bolted to one another. The central body member 10 has an axial passageway 16 therethrough with oppositely disposed, outwardly facing conical valve seats 17 and 17A spaced inwardly with respect to the opposite sides of the central body member 10.

A communicating passageway 18 extends from the passageway 16 and communicates with an air inlet passageway 19 in the base member 11 of the four-way air valve.

Still referring to FIG. 1 of the drawings, it will be seen that the opposite ends of the central body member 10 are recessed as at 20 and 21 and that the inner portions of the recesses 20 and 21 are provided with internal thread patterns which position partitions 22 and 23. The partitions 22 and 23 are annular and provided with exterior thread patterns so that they may be moved into desired position in the recesses 20 and 21. Each of the partitions 22 and 23 have apertures therethrough on the axial center line of the chamber 16 in the center body member 10 and each of the partitions 22 and 23 has an inwardly facing conical valve seat, one of which 24 is shown in FIG. 1 of the drawings. It will be observed that it is spaced with respect to the valve seat 17A and a similar construction is formed in the partition 22, as will be understood by those skilled in the art. Thus, air introduced into the four-way air valve by way of the air inlet port 19 will flow through the communicating passageway 18 into the axial passageway 16 and through the apertures in the partitions 22 and 23, when the same are not closed by valve elements 25 and 26 positioned on a free floating spool and stem 27, which is reciprocally disposed in the axial passageway 16 and extends through the apertured partitions 22 and 23. The opposite ends of the spool 27 are provided with spool nuts 28, and one of these is shown in cross section in FIG. 1 of the drawings.

By referring thereto, it will be seen that it mounts a coil spring 29 between its inner surface and a shoulder 30 on a solenoid plunger 31, which is loosely positioned in the spool nut 28. The other end of the solenoid plunger 31 is secured to the movable portion of a solenoid 32 which is positioned within its actuating coil 33, as will be understood by those skilled in the art.

The spool nut 28 on the opposite or left end of the spool 27 provides means against which an adjustment screw 34 may be positioned so that the longitudinal travel of the spool 27 and the valve elements 25 and 26 thereon may be confined to desired limits.

The valve elements 25 and 26 are resilient semi-spherical members preferably formed by polyethylene or the like and each is provided with oppositely disposed valve seat engaging surfaces, one of which is slightly larger in diameter than the other and thereby adapted to engage the conical valve seat formed in each of the apertured partitions 22 and 23.

It will thus be seen that the relatively deep chambers in the opposite ends of the main body member 10 formed by the recesses 20 and 21 position the apertured partitions 22 and 23 and thus in effect form spaced sub-chambers on either side thereof. Secondary communicating passageways 35 and 36 communicate with these sub-chambers on either side of the apertured partition 22 and the secondary passageways 35A and 36A communicate with the sub-chambers on either side of the apertured partition 23. The secondary passageways 35 and 36 communicate with exhaust and inlet ports in the valve base 11 respectively and the secondary passageways 35A and 36A communicate with inlet and exhaust ports 38A and 37A in the base 11 so that air cylinders to be operated by the valve can be placed in communication therewith as will be understood by those skilled in the art.

Still referring to FIG. 1 of the drawings, it will be seen that the soelnoid cover 15 is spaced with respect to the body member 13 by a resilient gasket 39 and that the cover 15 is secured to the body member 13 by at least one cap screw 40. The cap screw 40 is spaced with respect to the cover 15 by a resilient O-ring 41 so that the cover 15 actually is resiliently mounted with respect to the valve.

Those skilled in the art will observe that an electrical circuit is necessary to energize the coil 33 of the solenoid in order to actuate the same and electrical connections and wires are shown in connection with the coil 33 and broken away and they will obviously in practice lead to a control switch and an electric power source, not shown.

It will thus be seen that a novel four-way air valve has been disclosed which is formed of relatively simple machined parts and incorporates resilient valve elements mounted on a floating spool and between opposed pairs of conical valve seats and so positioned that upon actuation by a solenoid, as hereinbefore disclosed, the floating spool 27 and its valve elements move back and forth to direct air pressure to one or more pneumatic piston and cylinder assemblies that are in commnuication with the valve. The valve thus effectively controls the operation of the pneumatic piston and cylinder assemblies that are connected thereto and is capable of continuous operation over an exceedingly long life without stricking or jamming or leaking as has heretofore been common with other air pressure controlling valves known in the art.

Figure 2:
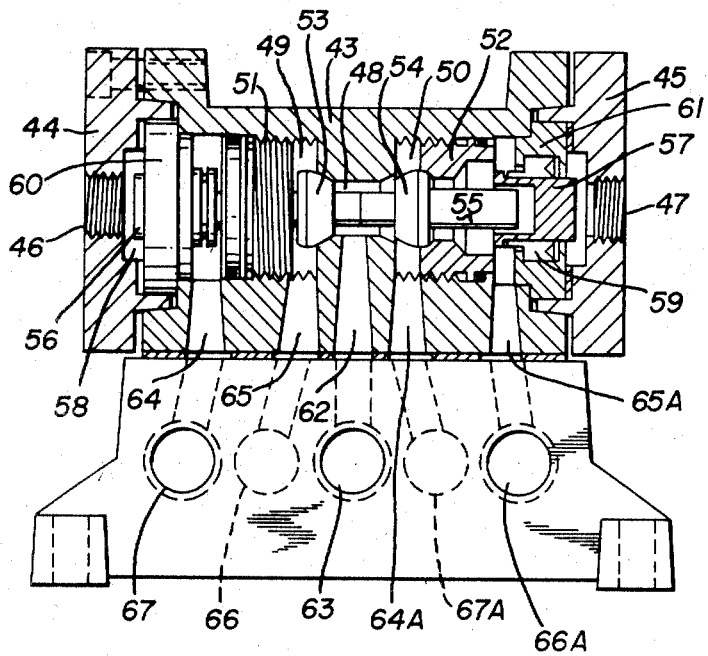
FIG. 2 is a cross sectional elevation of a modified form of air valve.

Those skilled in the art will observe that modification of the preferred construction hereinbefore described can be made within the scope of the invention and by referring to FIG. 2 of the drawings, one such modification will be seen. In FIG. 2 of the drawings, a main valve body 43 has end portions 44 and 45 secured thereto and including apertures 46 and 47 to which sources of air pressure may be connected. An axial passageway 48 in the main valve body 43 has oppositely disposed conical valve seats on its opposite ends where it communicates with a pair of chambers 49 and 50 which are in turn divided by annular apertured portions 51 and 52, which are also provided with conical valve seats on their inner sides so that resilient valve elements 53 and 54 on a spool 55 and stem 27 will register therewith when the spool is reciprocated. The spool 55 is disposed in the axial chamber 48 and extends through the chambers 49 and 50 and its end portions are loosely positioned in the interiors of hollow pistons 56 and 57 which are, in turn, reciprocally mounted in annnular resilient seals 58 and 59, which are carried in members 60 and 61 respectively.

A communicating passageway 62 extends between the axial chamber 48 through which the spool 55 extends and commnuicates with an air inlet port 63 in the base portion of the valve. Secondary communicating passageways 64, 64A and 65 and 65A establish communication with the chambers 49 and 50 respectively on either side of the apertured positions 51 and 52 and with inlet and exhaust ports 66 and 67 and 66A and 67A, also located in the base of the valve.

In the modification illustrated in FIG. 2, air pressure introduced into the apertures 46 or 47 will directly move the pistons 56 and 57 which will in turn engage the ends of the spool 55 and thus move the valve elements 53 and 54 into and out of registry with the four valve seats which are spaced horizontally with respect to one another, a relatively short distance with the resilient valve elements 53 and 54 positioned therebetween.

Those skilled in the art will observe that the spool 55 in the modified form of the valve just disclosed, as well as the spool 27 in the preferred embodiment, floats freely in the valve and are only loosely engaged by their moving means as the arrangement of the valve elements on the respective spools is such in association with the immediately adjacent valve seats that the spools remain operative, although capable of both reciprocal and limited transverse movement with respect to the valve seats. The resulting valve is unaffected by scale, dirt, oil and other contaminating materials commonly found in compressed air lines, particularly in industrial establishments and which contaminants have heretofore adversely affected pneumatic air valves.

The preferred and the modified form of the invention herein disclosed thereby meets the several objects of the invention and having thus described our invention what we claim is:

1. A poppet spool valve including a hollow casing with closed ends and an axial passageway centrally disposed therein, a valve seat at each end of the passageway, the casing having an air inlet opening intermediately of the valve seats, a similar axially adjustable partition means within the casing spaced from opposite ends of the axial passageway and each with a central opening therein, each partition means being spaced from the respective closed ends of the casing, thus providing an air receiving recess on opposite sides of each partition within the casing and each recess being in communication with an air exit passageway in the casing, a poppet valve stem extending in and through the axial passage and each end thereof extending through and beyond outer ends of each partition, valve members fixed on the stem in spaced relationship and for engagement and disengagement with their respective valve seats, and means in operative relationship with respective ends of the valve stem to axially move same with the secured valve means on or from their respective adjacent valve seats.

2. The valve as defined in and by claim 1, wherein each partition is sealed in the casing.

3. The valve as defined in and by claim 1, wherein resilient means at opposite ends of the valve stem is provided to resiliently urge the valve stem in seating one or the other of the valve members on its respective adjacent valve seat.

4. The valve as defined in and by claim 3, wherein the resilient means is spring means, and means carried by the casing to adjust the amount of resiliency that is applied to the said valve stem.

5. The valve as defined in and by claim 1, wherein the means at the respective ends of the valve stem is piston means.

References Cited

UNITED STATES PATENTS

| | | | |
|---|---|---|---|
| 2,574,096 | 11/1951 | Fischer et al. | 137—625.65 |
| 2,782,801 | 2/1957 | Ludwig | 137—625.48 |
| 3,060,970 | 10/1962 | Aslan | 137—625.65 XR |
| 3,092,145 | 6/1963 | Brinkel | 137—625.65 |
| 3,270,776 | 9/1966 | Carls | 137—625.6 X |

FOREIGN PATENTS

| | | |
|---|---|---|
| 517,380 | 2/1955 | Italy. |
| 1,206,129 | 8/1959 | France. |

HENRY T. KLINKSIEK, Primary Examiner

U.S. Cl. X.R.

137—269, 625.65; 251—77, 360